(12) United States Patent
Subramanian et al.

(10) Patent No.: US 11,019,046 B2
(45) Date of Patent: *May 25, 2021

(54) SYSTEM AND METHOD FOR GENERATING ENHANCED DISTRIBUTED ONLINE REGISTRY

(71) Applicant: Capital One Services, LLC, McLean, VA (US)

(72) Inventors: Ponnazhakan Subramanian, Mckinney, TX (US); Satish Chikkaveerappa, Mckinney, TX (US); Liju Mathews, Plano, TX (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/362,088

(22) Filed: Mar. 22, 2019

(65) Prior Publication Data

US 2020/0014674 A1    Jan. 9, 2020

Related U.S. Application Data

(63) Continuation of application No. 16/030,048, filed on Jul. 9, 2018, now Pat. No. 10,284,541.

(51) Int. Cl.
| | |
|---|---|
| *H04L 29/06* | (2006.01) |
| *H04L 29/08* | (2006.01) |
| *G06Q 50/00* | (2012.01) |
| *H04W 64/00* | (2009.01) |
| *H04W 76/10* | (2018.01) |
| *G06N 20/00* | (2019.01) |

(52) U.S. Cl.
CPC .............. *H04L 63/08* (2013.01); *G06N 20/00* (2019.01); *G06Q 50/01* (2013.01); *H04L 67/10* (2013.01); *H04L 67/26* (2013.01); *H04L 67/306* (2013.01); *H04W 64/00* (2013.01); *H04W 76/10* (2018.02)

(58) Field of Classification Search
None
See application file for complete search history.

(56) References Cited

U.S. PATENT DOCUMENTS

| | | |
|---|---|---|
| 5,970,474 A | 10/1999 | LeRoy et al. |
| 7,983,957 B2 | 7/2011 | Gabriel et al. |

(Continued)

*Primary Examiner* — Kaveh Abrishamkar
(74) *Attorney, Agent, or Firm* — Hunton Andrews Kurth LLP

(57) ABSTRACT

A system for generating an enhanced distributed online registry that utilizes an interoperable framework, and machine learning and natural language processing technologies to automatically provide compatible registry items. A persistent secure connection across distributed systems facilitates automatic synchronization of the generated online registry items across the distributed systems and devices accessing those systems. The online registry application processor utilizes machine learning and natural language technologies to generate an acquisition trending model which may be utilized to generate an enhanced distributed online registry that may determine and provide registry items that are compatible with the customer acquisition. Utilizing a persistent bi-directional connection, the online registry application processor may automatically synchronize the enhanced distributed online registry in real time as registry items are added and purchased.

20 Claims, 7 Drawing Sheets

(56) References Cited

U.S. PATENT DOCUMENTS

| | | | |
|---|---|---|---|
| 8,346,625 B2 | 1/2013 | Song | |
| 8,346,626 B2 | 1/2013 | Robertson | |
| 8,589,314 B2 | 11/2013 | Friedman | |
| 10,284,541 B1* | 5/2019 | Subramanian | H04W 12/00503 |
| 10,325,315 B1* | 6/2019 | Tang | G06K 9/6262 |
| 2003/0093333 A1 | 5/2003 | Veeneman | |
| 2008/0172291 A1* | 7/2008 | Hurowitz | G06Q 30/02 |
| | | | 705/14.1 |
| 2009/0204528 A1* | 8/2009 | Moses | G06Q 40/06 |
| | | | 705/35 |
| 2011/0035503 A1* | 2/2011 | Zaid | H04L 63/0442 |
| | | | 709/228 |
| 2011/0270660 A1* | 11/2011 | Bettioi | G06Q 30/02 |
| | | | 705/14.25 |
| 2013/0030985 A1* | 1/2013 | Shebesta | G06Q 40/02 |
| | | | 705/38 |
| 2013/0046606 A1* | 2/2013 | Mandrychenko | G06Q 30/0207 |
| | | | 705/14.27 |
| 2013/0066724 A1* | 3/2013 | Evans | G06O 30/0255 |
| | | | 705/14.66 |
| 2013/0117151 A1 | 5/2013 | Macaisa et al. | |
| 2013/0282466 A1* | 10/2013 | Hampton | G06Q 30/0603 |
| | | | 705/14.27 |
| 2014/0052572 A1 | 2/2014 | Savilla et al. | |
| 2014/0081798 A1 | 3/2014 | Millstone-Shroff et al. | |
| 2014/0379580 A1* | 12/2014 | Varma | G06Q 20/409 |
| | | | 705/44 |
| 2015/0012379 A1 | 1/2015 | Fulinara et al. | |
| 2015/0127483 A1* | 5/2015 | Elliot | G06O 30/0633 |
| | | | 705/26.8 |
| 2015/0254762 A1* | 9/2015 | Fisher | G06Q 30/08 |
| | | | 705/26.3 |
| 2016/0078489 A1* | 3/2016 | Hu | G06Q 50/01 |
| | | | 705/14.66 |
| 2017/0169473 A1* | 6/2017 | Boudville | G06Q 30/0267 |
| 2019/0108458 A1* | 4/2019 | Yu | G06N 20/00 |
| 2019/0287662 A1* | 9/2019 | Hennie | G06F 21/31 |

* cited by examiner

SYSTEM AND METHOD FOR GENERATING ENHANCED DISTRIBUTED ONLINE REGISTRY

CROSS REFERENCE TO RELATED APPLICATION

The subject application is a Continuation of Ser. No. 16/030,048 filed Jul. 9, 2018, the contents of which is hereby incorporated by reference in its entirety.

FIELD OF DISCLOSURE

The present disclosure relates to systems and methods for generating an enhanced distributed online registry that utilizes an interoperable framework, and machine learning and natural language processing technologies to automatically provide compatible registry items. The systems and methods utilize a persistent secure connection to facilitate automatic synchronization of the generated online registry items across the distributed systems and devices accessing those systems.

BACKGROUND OF THE DISCLOSURE

Online registry generation is time consuming, resource intensive and requires duplicative processing. Currently, online registry systems are not comprehensively integrated with merchant and acquisition systems. Online registries require customers to manually select registry items and manually share the registries with other users. Such registry systems do not utilize existing infrastructures of associated third party systems to provide comprehensive and efficient generation.

Additionally, this lack of comprehensive integration prevents the establishment of a persistent bi-directional connection between a client device and an online registry server. As such, as items are simultaneously added, removed and purchased from an online registry, multiple inconsistent instances of the online registry as accessed by the client device and that which is stored on the online registry server may result.

These and other drawbacks exist.

SUMMARY OF THE DISCLOSURE

Various embodiments of the present disclosure provide systems and methods for generating an enhanced distributed online registry. An online registry system is fully integrated with an acquisition server and third party systems, including social networking systems. This unique integration facilitates the generation of an enhanced distributed online registry that may automatically determine registry items that are compatible with an item purchased by a customer, and may also be compatible with customer preferences.

Specifically, an online registry system may include an online registry application processor, an authentication processor, data storage, and a communication interface. The online registry application processor may securely communicate with an acquisition server that is configured to provide real-time acquisition determinations and may transmit to the online registry application processor an acquisition request approval including at least customer identification information, customer financial information, and one or more customer acquisition preferences retrieved from the data storage. Information from existing online registries, merchant systems, and the like, along with the customer identification information, the customer financial information may be processed and clustered utilizing machine learning and natural language technologies to generate an acquisition trending model.

The online registry application processor may utilize the acquisition trending model to generate an enhanced distributed online registry that may determine and provide registry items that are compatible with the customer acquisition. The online registry system may include an authentication processor that may evaluate user data and user input to authenticate the user. Upon authentication, the system may transmit a secure link to the user device that provides access to the enhanced distributed online registry.

Utilizing a persistent bi-directional connection, the online registry application processor may automatically synchronize the enhanced distributed online registry in real time as registry items are added and purchased. The online registry application processor may be seamlessly integrated with third party systems. For example, a secure communication interface may be established with a third party social networking system, that may be configured to share a secure link that provides access to the enhanced distributed online registry.

As such, this unique interoperable framework enhances the online registry system's machine learning and natural language processing technologies to automatically provide compatible registry items. The persistent secure connection across distributed systems facilitates automatic synchronization of the generated online registry items across the distributed systems and devices accessing those systems.

DETAILED DESCRIPTION OF THE EMBODIMENTS

The following description is intended to convey a thorough understanding of the embodiments described by providing a number of specific example embodiments and details involving generating an enhanced distributed online registry. Merchant sites may include, for example auto merchants, stores, etc. It should be appreciated, however, that the present disclosure is not limited to these specific embodiments and details, which are examples only. It is further understood that one possessing ordinary skill in the art, in light of known systems and methods, would appreciate the use of the invention for its intended purposes and benefits in any number of alternative embodiments, depending on specific design and other needs. A user device is used as an example for the disclosure. The disclosure is not intended to be limited to user devices only. For example, many other electronic devices may utilize an online registry system to generate an enhanced distributed online registry that utilizes an interoperable framework, and machine learning and natural language processing technologies to automatically provide compatible registry items.

Though the example provided herein relates to generating an enhanced online registry providing registry items that are compatible with a customer acquisition, one of skill in the art would appreciate that the utilization of an interoperable framework, distributed processing, automatic data synchronization and authentication technologies described herein could be utilized in various online registry systems, such as the various systems identified below.

Figure 1:
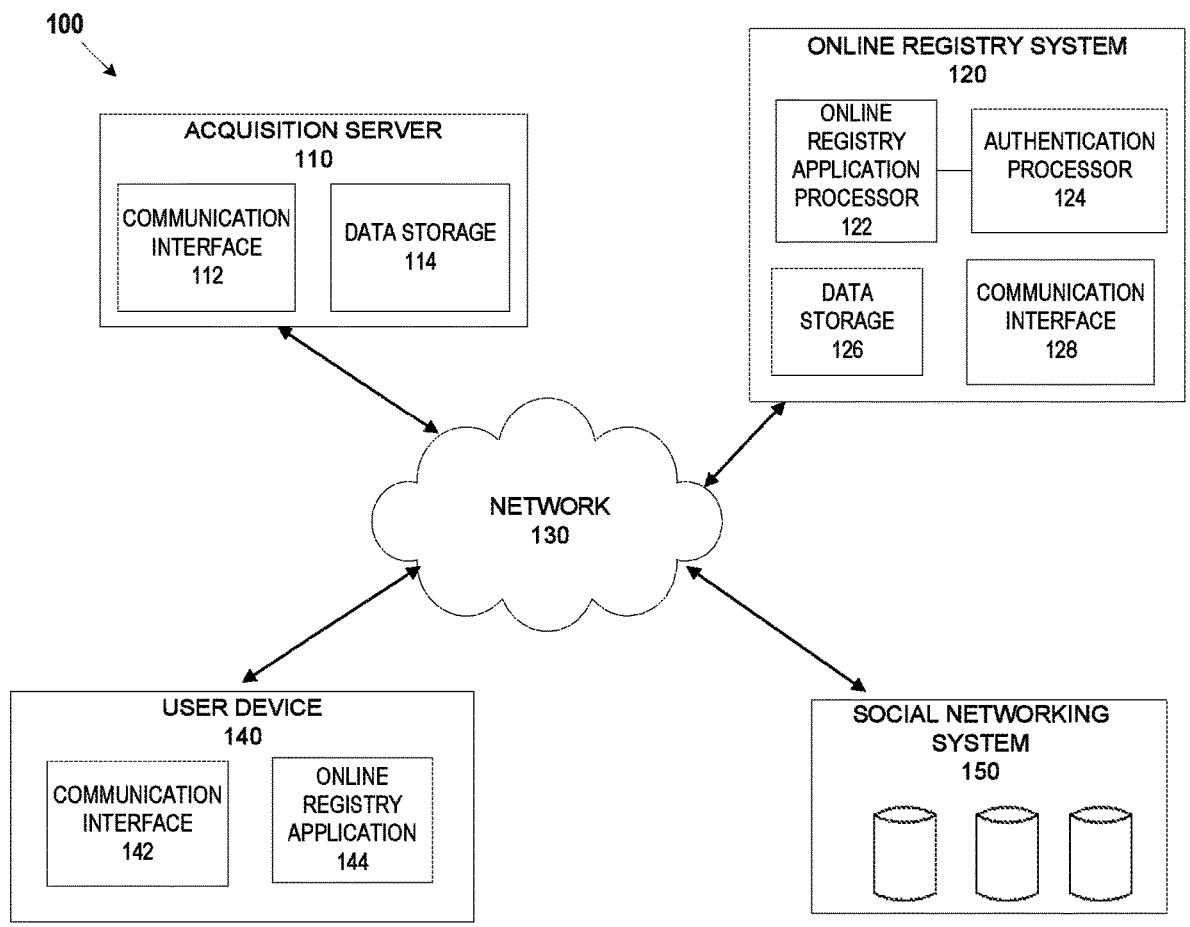
FIG. 1 depicts an example system for generating and sharing an enhanced distributed online registry, according to embodiments of the disclosure.

FIG. 1 depicts an example system 100 for generating an enhanced distributed online registry. As shown in FIG. 1, an example system 100 may include one or more acquisition servers 110, an online registry system 120, one or more user devices 140, and one or more social networking systems 150 connected over one or more networks 130.

An online registry system 120 may receive an acquisition request approval from acquisition server 110, which may be configured to provide real-time acquisition determinations. For example, online registry system 120 may receive a notification from an acquisition system, tied to an acquisition of a car purchase by a customer (registry owner), including at least customer identification information, customer financial information, one or more customer acquisition preferences, customer age, customer gender, customer occupation, date of acquisition, location of acquisition, purchase price for acquisition, and the like. Online registry system 120 may have differentiated access to the acquisition server 110, other third party systems, including merchant systems, social networking system 150, and the like via private Application Programming Interfaces (APIs). Online registry system 120 may make calls to the APIs utilizing a token to provide a secure communication channel. The set of APIs may also provide a secure communication channel between a user device 140, and online registry system 120.

Online registry application processor 122 may retrieve information from existing online registries and other systems, and may cluster the received customer identification information, customer financial information, customer acquisition preferences, and the like to generate an acquisition trending model, which may be stored in data storage. The system generated acquisition trending model may be utilized by online registry application processor 122 to generate an enhanced distributed online registry that may automatically determine and provide registry items that are compatible with the associated customer acquisition.

Online registry application processor may transmit via communication interface 128 a push notification to user device 140, where the user device is associated with a registry recipient user. The push notification may include data indicative of the enhanced distributed online registry.

The network 130 may be one or more of a wireless network, a wired network or any combination of wireless network and wired network. Network 130 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g, a Bluetooth network, or any other wired or wireless network for transmitting and receiving a data signal.

In addition, network 130 may include, without limitation, telephone lines, fiber optics, IEEE Ethernet 902.3, a wide area network ("WAN"), a local area network ("LAN"), a wireless personal area network ("WPAN"), a wide body area network ("WBAN") or a global network such as the Internet. Also network 130 may support an Internet network, a wireless communication network, a cellular network, or the like, or any combination thereof. Network 130 may further include one network, or any number of the example types of networks mentioned above, operating as a stand-alone network or in cooperation with each other. Network 130 may utilize one or more protocols of one or more network elements to which they are communicatively coupled. Network 130 may translate to or from other protocols to one or more protocols of network devices. Although network 130 is depicted as a single network, it should be appreciated that according to one or more embodiments, network 130 may comprise a plurality of interconnected networks, such as, for example, the Internet, a service provider's network, a cable television network, corporate networks, and home networks.

Acquisition server 110, online registry system 120, user device 140, and/or social networking system 150 also may include a network-enabled computer system and/or device. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network. For example, online registry system 120 may include, for example, components illustrated in FIG. 2.

Acquisition server 110, online registry system 120, user device 140, and/or social networking system 150, may include at least one central processing unit (CPU), which may be configured to execute computer program instructions to perform various processes and methods. Acquisition server 110, online registry system 120, user device 140, and/or social networking system 150 may include data storage, including for example, random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel® file, Microsoft® Access® file, a solid state storage device, which may include an all flash array, a hybrid array, or a server-side product, enterprise storage, which may include online or cloud storage, or any other storage mechanism.

Acquisition server 110, online registry system 120, user device 140, and/or social networking system 150 may further include, for example, a processor, which may be several processors, a single processor, or a single device having multiple processors. Although depicted as single elements, it should be appreciated that according to one or more embodiments, acquisition server 110, online registry system 120, user device 140, and/or social networking system 150, and/or may comprise a plurality of acquisition servers 110, online registry systems 120, user devices 140, and/or social networking systems 150. As shown in FIG. 1, each acquisition server 110, online registry system 120, user device 140, and/or social networking system 150. As used herein, the term "component" may be understood to refer to computer executable software, firmware, hardware, and/or various combinations thereof. It is noted there where a component is a software and/or firmware component, the component is configured to affect the hardware elements of an associated system. It is further noted that the components shown and described herein are intended as examples. The components may be combined, integrated, separated, or duplicated to support various applications. Also, a function described herein as being performed at a particular component may be performed at one or more other components and by one or more other devices instead of or in addition to the function performed at the particular component. Further, the components may be implemented across multiple devices or other components local or remote to one another. Additionally, the components may be moved from one device and added to another device, or may be included in both devices.

As depicted in FIG. 1, an acquisition server 110 may include a communication interface 112 and data storage 114. Acquisition server 110 may be configured to provide real-time acquisition determinations, and may include various hardware and software components to communicate, via communication interface 112, between a merchant, acquisition system, account provider system and/or a user device to provide prequalification for financing, provide financing, and process a transaction such as a user purchase. In one embodiment, acquisition server 110 may be utilized by a customer to search for a car at a particular auto merchant, obtain prequalification for financing for the car, purchase and fund the car by the associated account provider system.

The acquisition server 110 may be part of the backend computing systems and associated servers of a merchant, account provider systems, and the like. An account provider system may include, by way of example and not limitation, depository institutions (e.g., banks, credit unions, building societies, trust companies, mortgage loan companies, prepaid gift cards or credit cards, etc.), contractual institutions (e.g., insurance companies, pension funds, mutual funds, etc.), investment institutions (e.g., investment banks, underwriters, brokerage funds, etc.), and other non-bank financial institutions (e.g., pawn shops or brokers, cashier's check issuers, insurance firms, check-cashing locations, payday lending, currency exchanges, microloan organizations, crowd-funding or crowd-sourcing entities, third-party payment processors, etc.).

Data storage 114 may store data and/or components to enable the generation, transmission and processing of customer data associated with an account (e.g., card number, account type, account balance, account limits, budget data, recent transactions, pairing data such as time and date of pairing with a mobile device, and the like) and account holder data (e.g., account holder name, address, phone number(s), email address, demographic data, and the like).

Acquisition server 110 may include components to send and/or receive data for use in other components, such as communication interface 112. A communication interface 112 may include various hardware and software components, such as, for example, a repeater, a microwave antenna, a cellular tower, or another network access device capable of providing connectivity between network mediums. The communication interface 152 may also contain various software and/or hardware components to enable communication over a network 130. For example, communication interface 112 may be capable of sending or receiving signals via network 130. Moreover, communication interface 112 may provide connectivity to one or more wired networks and may be capable of receiving signals on one medium such as a wired network and transmitting the received signals on a second medium such as a wireless network.

Online registry system 120 may include online registry application processor 122, authentication processor 124, data storage 126, and communication interface 128. Online registry system 120 may include data and/or components, systems, and interfaces, including application programming interfaces (APIs) to enable the generation, transmission, and processing of data including digital authentication data. Online registry application processor 122 may receive from acquisition server 110 an acquisition request approval including at least customer identification information, customer financial information, and one or more customer acquisition preferences that may be retrieved from data storage 126. Utilizing machine learning and natural language processing technologies, online registry application processor 122 may cluster and evaluate information retrieved from existing registries, which may include customer, product, and merchant information associated with similar acquisition requests, to generate an acquisition trending model, which may be stored in data storage 126. Online registry application processor 122 may build content to be processed by the machine learning and natural language processing technologies and learning models based on factors associated with the acquisition, which may include location of the acquisition, price of the acquisition, climatic conditions of the acquisition, and the like. For example, for a car that is purchased during the winter in a location with a cold climate prone to snow and ice, in building the acquisition trending model, online registry application processor may evaluate the location and climatic conditions including the cold climate and snow, to recommend registry products based on these conditions, which may include items such as four wheel drive, snow tires, seat warmers, and the like. Online registry application processor 120 may utilize an API to communicate with third party systems to evaluate these factors which are utilized to build the content which is processed to generate the acquisition trending model. For example, online registry application processor may communicate with a third party weather application system to obtain information to determine the weather of a location associated with an acquisition. The processor may utilize the retrieved weather information to build a learning model that takes into account this weather factor when building the acquisition trending model and consequently determining and recommending registry items that are compatible with the customer acquisition.

Online registry application processor 122 may utilize the acquisition trending model to generate an enhanced distributed online registry that automatically determines and recommends registry items that are compatible with the customer acquisition.

Online registry system 120 may include an authentication processor 124 connected to online registry application processor 122 to generate and process authentication data associated with a user trying to access the system generated online registry. Authentication processor 124 may receive user data and user input associated with an authentication request, sent from user device 140 via communication interface 142 to authenticate the user. Authentication processor 124 may evaluate the user data and user input, and upon authentication, online registry system may transmit a secure link to user device 140 that provides access to the enhanced distributed online registry.

As depicted in FIG. 1, user device 140 may be any device capable of communicating via, for example, Bluetooth technology, NFC technology, WiFi Direct technology, and/or the like and execute various functions to transmit and receive user data (e.g., card number, account type, account balance, account limits, budget data, recent transactions, and/or the like). User device 140 may include components to send and/or receive data for use in other components, such as communications interface 142. For example, user device 140 could be an iPhone, iPod, iPad, and/or Apple Watch from Apple® or other mobile device running Apple's iOS operating system, devices running Google's Android® operating system, including, for example, smartphones running the Android® operating system and other wearable mobile devices, such as Google Glass or Samsung Galaxy Gear Smartwatch, devices running Microsoft's Windows® Mobile operating system, and/or any other smartphone, smartwatch, tablet, or like device.

The current location of user device 140 may be determined using many different technologies such as GPS technology, Internet-based technology, etc., which may utilize location data. By way of example, location data may include, but is not limited to GPS data, assisted GPS data, IP address data, cell ID data, received signal strength indication (RSSI) data, wireless fingerprinting data, inertial sensor data (e.g., compass or magnetometer data, accelerometer data, and/or gyroscope data), barometer data, ultrasonic data (e.g., radio-frequency identification (RFID) data, near-field communication (NFC) data), Bluetooth data, and/or terrestrial transmitter data.

User device 140 may also include various software components to facilitate the account and payment operations including an application processor (not shown in FIG. 1). For example, user device 140 may include an operating system such as, for example, the iOS® operating system from Apple®, the Google® Android® operating system, and the Windows Mobile® operating system from Microsoft®. Mobile device 120 may also include, without limitation, software applications such as mobile banking applications and financial institution applications to facilitate ordering and payment, an NFC application programming interface, and software to enable touch sensitive displays. Mobile device manufacturers may provide software stacks or Application Programming Interfaces (APIs) which allow software applications to be written on top of the software stacks. For example, mobile device manufacturers may provide, without limitation, a card emulation API to enable NFC card emulation mode, a logic link control protocol (LLCP) API for peer-to-peer communication between mobile devices, a Bluetooth® API supporting BLE, and a real-time data (RTD) API and a NFC Data Exchange Format (NDEF) API for reading/writing.

The application processor may enable execution of software applications on mobile device 140, which may include online registry application 144, which may include various user interfaces, which may leverage transaction data, wireless data connection, over-the-air data connection, or other means of data transmission to allow a user to securely access and purchase items from the system generated online registry.

The data used in the application may be transmitted, for example, from external data sources. The application and user interface may leverage information about compatible registry items, including products and/or services being purchased, information about the account or account holder, information about the merchant and/or other parties involved in a transaction, rewards information, promotional information, advertising information, and other useful information. Software applications on mobile device 140, including, for example, online registry application 124, which may be integrated with or separate from a mobile wallet application, which may be utilized to seamlessly purchase items from the system generated online registry.

System 100 may also include a social networking system 150, which may communicate with social networking sites, which may include, without limitation, Facebook, MySpace, Google+, LinkedIn, Twitter, Pinterest, Instagram, etc. The social networking site may include a plurality of social networking accounts created by one or more users. The users may also be customers associated with acquisition server 110. Online registry system 120 may establish a secure connection with social networking system 150, utilizing secure communication interface 128 to share a secure link that provides access to the system generated enhanced distributed online registry.

Figure 2:
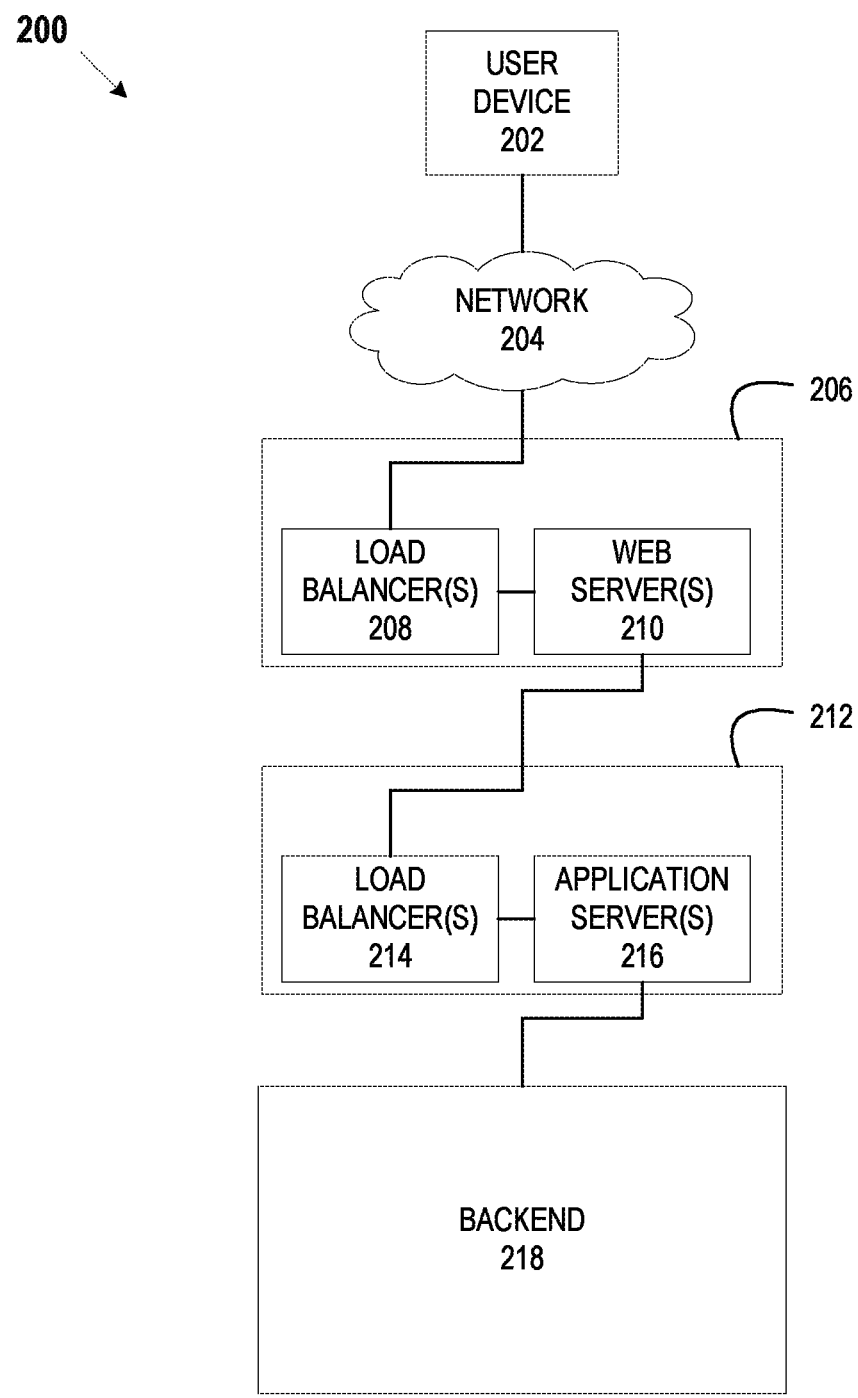
FIG. 2 depicts an example system including a backend processor, according to embodiments of the disclosure.

Referring to FIG. 2, system 200 may include a system to generate an enhanced distributed online registry. For example, system 200 may include a user device 202, which may be similar to user device 140, a network 204, which may be similar to network 130, a front-end controlled domain 206, a back-end controlled domain 212, and a backend system 218. Front-end controlled domain 206 may include one or more load balancers 208 and one or more web servers 210. Back-end controlled domain 212 may include one or more load balancers 214 and one or more application servers 216.

User device 202 may be a network-enabled computer. As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 200 may execute one or more software applications to enable, for example, network communications.

User device 202 may include an iPhone@, iPod®, iPad®, and/or Apple Watch® from Apple® or any other mobile device running Apple's iOS® operating system, any device running Google's Android® operating system, including for example, Google's wearable device, Google Glass®, any device running Microsoft's Windows® Mobile operating system, and/or any other smartphone or like wearable mobile device.

Network 204 may be one or more of a wireless network, a wired network, or any combination of a wireless network and a wired network. For example, network 304 may include one or more of a fiber optics network, a passive optical network, a cable network, an Internet network, a satellite network, a wireless LAN, a Global System for Mobile Communication (GSM), a Personal Communication Service (PCS), a personal area network, (PAN), D-AMPS, Wi-Fi, fixed wireless data, IEEE 802.11b, 802.15.1, 802.11n, and 802.11g or any other wired or wireless network for transmitting and receiving a data signal.

In addition, network 204 may include, without limitation, telephone lines, fiber optics, IEEE Ethernet 902.3, a wide area network (WAN), a local area network (LAN), a wide body area network ("WBAN") or a global network such as the Internet. Also, network 204 may support an Internet network, a wireless communication network, a cellular network, or the like, or any combination thereof. Network 204 may further include one network, or any number of example types of networks mentioned above, operating as a stand-alone network or in cooperation with each other. Network 304 may utilize one or more protocols of one or more network elements to which they are communicatively couples. Network 204 may translate to or from other protocols to one or more protocols of network devices. Although network 204 is depicted as a single network, it should be appreciated that according to one or more embodiments, network 204 may comprise a plurality of interconnected networks, such as, for example, the Internet, a service provider's network, a cable television network, corporate networks, and home networks.

Front-end controlled domain 206 may be implemented to provide security for backend 218. Load balancer(s) 208 may distribute workloads across multiple computing resources, such as, for example computers, a computer cluster, network links, central processing units or disk drives. In various embodiments, load balancer(s) 210 may distribute workloads across, for example, web server(s) 216 and/or backend 218 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 208 may include software that monitoring the port where external clients, such as, for example, user device 202, connect to access various services of a financial institution, for example. Load balancer(s) 208 may forward requests to one of the application servers 216 and/or backend 218 servers, which may then reply to load balancer 208. This may allow load balancer(s) 208 to reply to user device 202 without user device 202 ever knowing about the internal separation of functions. It also may prevent user devices from contacting backend servers directly, which may have security benefits by hiding the structure of the internal network and preventing attacks on backend 218 or unrelated services running on other ports, for example.

A variety of scheduling algorithms may be used by load balancer(s) 208 to determine which backend server to send a request to. Simple algorithms may include, for example, random choice or round robin. Load balancers 208 also may account for additional factors, such as a server's reported load, recent response times, up/down status (determined by a monitoring poll of some kind), number of active connections, geographic location, capabilities, or how much traffic it has recently been assigned.

Load balancers 208 may be implemented in hardware and/or software. Load balancer(s) 308 may implement numerous features, including, without limitation: asymmetric loading Priority activation: SSL Offload and Acceleration; Distributed Denial of Service (DDoS) attack protection; HTTP/HTTPS compression; TCP offloading TCP buffering; direct server return; health checking HTTP/HTTPS caching; content filtering; HTTP/HTTPS security; priority queuing; rate shaping; content-aware switching; client authentication; programmatic traffic manipulation; firewall; intrusion prevention systems.

Web server(s) 210 may include hardware (e.g., one or more computers) and/or software (e.g., one or more applications) that deliver web content that can be accessed by, for example a client device (e.g., user device 202) through a network (e.g., network 204), such as the Internet. In various examples, web servers, may deliver web pages, relating to, for example, online banking applications and the like, to clients (e.g., user device 202). Web server(s) 210 may use, for example, a hypertext transfer protocol (HTTP/HTTPS or sHTTP) to communicate with user device 202. The web pages delivered to user device may include, for example, HTML documents, which may include images, style sheets and scripts in addition to text content.

A user agent, such as, for example, a web browser, web crawler, or native mobile application, may initiate communication by making a request for a specific resource using HTTP/HTTPS and web server 210 may respond with the content of that resource or an error message if unable to do so. The resource may be, for example a file on stored on backend 218. Web server(s) 210 also may enable or facilitate receiving content from user device 202 so user device 202 may be able to, for example, submit web forms, including uploading of files.

Web server(s) also may support server-side scripting using, for example, Active Server Pages (ASP), PHP, or other scripting languages. Accordingly, the behavior of web server(s) 210 can be scripted in separate files, while the actual server software remains unchanged.

Load balancers 214 may be similar to load balancers 208 as described above.

Application server(s) 216 may include hardware and/or software that is dedicated to the efficient execution of procedures (e.g., programs, routines, scripts) for supporting its applied applications. Application server(s) 216 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server(s) 216 may act as a set of components accessible to, for example, a financial institution, or other entity implementing system 200, through an API defined by the platform itself. For Web applications, these components may be performed in, for example, the same running environment as web server(s) 210, and application servers 216 may support the construction of dynamic pages. Application server(s) 216 also may implement services, such as, for example, clustering, fail-over, and load-balancing. In various embodiments, where application server(s) 216 are Java application servers, the web server(s) 216 may behaves like an extended virtual machine for running applications, transparently handling connections to databases associated with backend 218 on one side, and, connections to the Web client (e.g., user device 202) on the other.

Backend 218 may include hardware and/or software that enables the backend services of, for example, a financial institution, merchant, acquisition or other entity that maintains a distributed system similar to system 200. For example, backend 318 may include, a system of record, online banking applications, encryption applications, BLE/Bluetooth connection platforms, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, and/or a location system, which may include additional capabilities, such as transaction card data generation, transaction processing, and/or transmission of account and/or transaction data. Backend 218 may be associated with various databases, including account databases that maintain, for example, cardholder information (e.g., demographic data, credit data, cardholder profile data, and the like), transaction card databases that maintain transaction card data (e.g., transaction history, account balance, spending limit, budget categories, budget spending, budget limits, and the like), connection information (e.g., public/private key pairs, UUIDs, device identifiers, and the like) and the like. Backend 218 also may be associated with one or more servers that enable the various services provided by system 200. Backend 218 may enable an online registry system to implement various functions associated with generating an enhanced distributed online registry that determines and provides registry items that are compatible with a customer acquisition.

Figure 3:
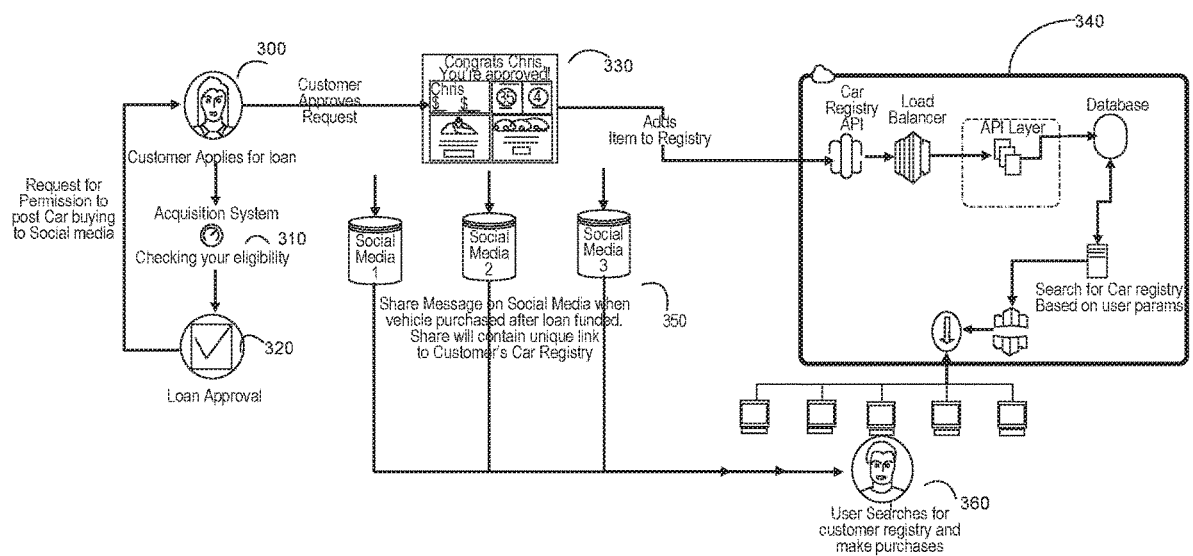
FIG. 3 depicts a schematic diagram of a system for generating and sharing an enhanced distributed online registry, according to embodiments of the disclosure.

FIG. 3 depicts a schematic diagram of utilization of a system for generating, via an online registry application processor, and sharing, via third party social networking systems, an enhanced distributed online registry, according to the embodiments of the disclosure. For instance, the system for generating an enhanced distributed online registry, by integrating an acquisition system with an online registry system, may provide a seamless experience for a customer 300 through electronic financing processing, purchasing processing to generation of the online registry associated with the customer's purchase.

Utilizing an acquisition system 310, a customer may, via an acquisition application on a customer device, simultaneously apply for a loan to purchase an item, such as a car, and may search across various merchant systems associated with the acquisition system for cars to purchase. The acquisition system may determine whether or not to approve the financing 320. Upon approving financing and facilitating purchase of an item, acquisition system may transmit a request for permission to a customer device, via a push notification through the acquisition application, to share 300, via a social media system, a notification of the customer's purchase of the item.

Upon receipt of a confirmation message from the customer via the customer device 330, the acquisition system may communicate with social networking systems to share a message that the customer has purchased an item 350. A user profile may be created for each customer that may be stored in data storage on the acquisition server. A customer may opt in to automatically share notifications of acquisitions to social media upon completion of acquisition processing, and this permission may be stored in the customer's associated user profile. The acquisition system may evaluate whether a customer has opted in to share notifications of acquisitions via social media, and if the system determines that the customer has, the associated notification will automatically be shared. Additionally, a customer may, via an acquisition application, request to share notifications of acquisitions via social media.

Acquisition system 310 is fully integrated with online registry system 340, and this integration may facilitate the generation of an enhanced distributed online registry that may provide registry items that are compatible with the item purchased, and may also be compatible with customer preferences. The online registry system, upon receiving a notification from the acquisition that a customer has made a purchase, may retrieve and utilize data from the acquisition system pertaining to the item purchased and also associated customer information. Information from existing online registries and other systems may be retrieved and clustered with customer identification information, customer financial information, and the like. For example, the online registry system may utilize a web scraping API to extract content related to an acquisition from websites.

The online registry system may utilize machine learning technologies that provide further insights into the customers' interests and purchase histories, demographic information including age, location, gender, occupation, and the like, based on the retrieved and clustered data, as well as natural language processing technologies that are utilized to parse and process information from existing registries such that the information may be automatically formatted, to generate an acquisition trending model. For example, the online registry may utilize a computational framework such as TensorFlow to build the acquisition trending model which facilitates big data processing that minimizes system resources. For example, a base computational framework may be enhanced by adding an additional machine learning layer, which may build and utilize algorithms that evaluate parameters associated with an acquisition, which may include location of the acquisition, price of the acquisition, climatic conditions of the acquisition, and the like. The online registry system may build trending models based on the trending of the particular parameters. The generated acquisition trending model may be added to a user profile of the customer, which may be stored in data storage of the online registry system.

Acquisition system may also directly suggest items associated with purchased item to be added to the system generated online registry. For example, if a customer purchased a car, the acquisition system may recommend registry items such as car accessories, different packages of car warranties, and car maintenance coupons. A customer may also manually add items to the system generated online registry, which may automatically update the registry.

In this example, online registry system 340 may utilize a registry API, load balancer, API layer and database. Online registry system may transmit an alert to a customer device of the customer (registry recipient) who purchased the item, providing a notification that the online registry has been created. The alert may include a secure link that may be utilized to access the online registry on a customer device. Online registry system may also automatically transmit alerts to users (buyers) associated with the customer, upon generation of the online registry, providing a notification that the online registry has been created, and including a secure link that may be utilized to access the online registry on a user device via an online registry application. A user 360 may also manually search for a customer's online registry.

An online registry application on a user device may be utilized to access a customer's online registry. User device may utilize location-tracking systems and methods, such as geo-fencing technologies, to determine the current location of the user's mobile device, and to generate real time location based notifications, which may be transmitted to the online registry system. Based on the determined geolocation of the user device, the online registry system may transmit notifications to the user device indicating the nearest location of preferred vendors of the associated registry items.

The online registry system may communicate with social networking systems to transmit and post notifications that an online registry has been created for a particular customer, that may be available to members of the customer's social network who have permissions, established by the security systems of the social networking systems, to receive such notifications.

Figure 4:
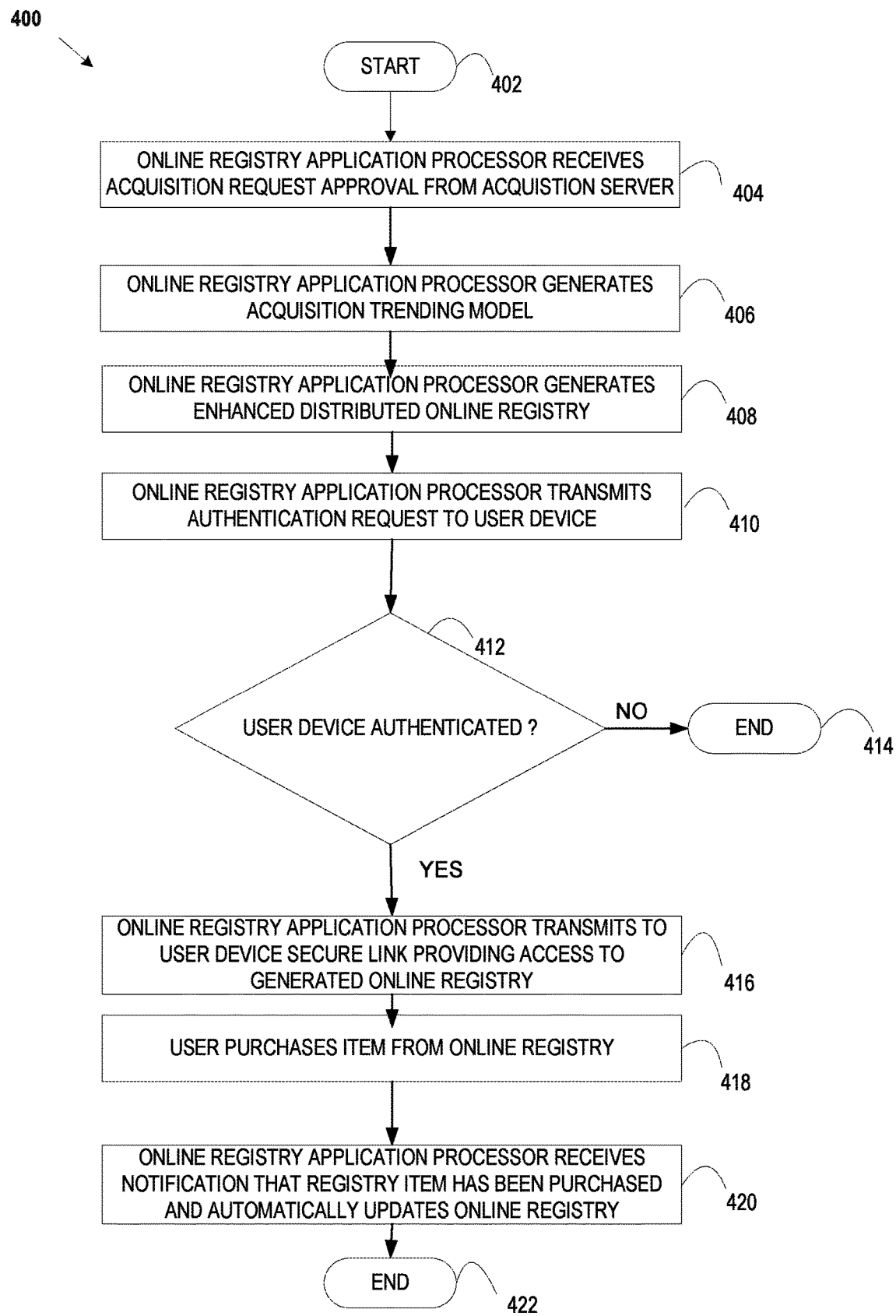
FIG. 4 depicts an example method for generating and updating an enhanced distributed online registry, according to embodiments of the disclosure.

FIG. 4 illustrates an example method for generating and automatically updating an enhanced distributed online registry. The process 400 may begin at block 402. At block 404, online registry application processor 120 may receive from acquisition server 110 an acquisition request approval including at least customer information, customer financial information, and one or more acquisition preferences. At block 406, online registry application processor 122 may retrieve information from existing online registries and other systems, and may cluster the customer identification information, the customer financial information, and the customer acquisition preferences with respect to the information from the existing online registries and other systems to generate an acquisition trending model. Online registry application processor 122 may utilize machine learning technologies that provide further insights into customers' interests and purchase histories, demographic information including age, location, gender, occupation, based on the retrieved and clustered data, as well as natural language processing technologies that are utilized to parse and process information from existing registries such that the information may be automatically formatted, to generate an acquisition trending model. The generated acquisition trending model may provide a large profile of trending items associated with a customer acquisition.

At block 408, online registry application processor 122 may utilize the acquisition trending model to generate an enhanced distributed online registry which may recommend registry items for purchase based on a customer's acquisition. Utilizing the unique integration with acquisition server 110, the generated enhanced distributed online registry may recommend registry items that are compatible with the item purchased by a customer. For example, in the context of a car registry, the system generated enhanced distributed online registry may provide registry items such as car accessories, different packages of car warranty, car maintenance packages that are compatible with the purchased car across various merchant systems which are integrated with the online registry system. The system may at set time intervals, as determined by the system or as specified by the registry owner, continue to retrieve information from existing online registries and other systems, and updated customer identification information, the customer financial information, customer transaction information and the customer acquisition preferences to further enhance the acquisition trending model. Accordingly, as the acquisition trending model is enhanced, additional compatible registry items may be added. The system generated online registry may be shared with other users to assist in the communication and seamless channel to purchase the customer's registry items.

At block 410, authentication processor 124 connected to online registry application processor 122 may transmit an authentication request to a user device to provide access via a secure connection to the online registry. The authentication request may include a request of authentication data based on the associated user device, user account data, and user privacy data.

Authentication data may include an alphanumeric code, a customer pattern, biometric data, a password, registered information (e.g., registered known devices), device fingerprinting, device authentication mechanisms (e.g., device PIN, device pattern login, device fingerprint or other device biometric), and the like. User device data may include information such as service provider, device make, device model, device number, device IP address, and/or service provider plan data. User device data may be determined using data stored in user account data and/or data received from a third party, such as a customer service provider.

Authentication processor 124 may identify a user device 140 using device fingerprinting (where many factors of the device are used to uniquely recognize the device), cookies, device ID (secure element ID (SEID), mobile equipment identifier (MEID), international mobile equipment identifier (IEMEI), mobile directory number (MDN), mobile identifier number (MIN), and SIM card identifier), mobile document verification. The device specific identifiers may not be accessible to third party applications, but may be available to a device manufacturer or mobile network operator's application or a third party application with access to certain private APIs that would provide this information.

As an example, authentication data may be generated to include an alphanumeric code (e.g., a four-digit code, an-eight-digit code, and the like) and/or a user confirmation request. Authentication data may be generated in response to receive data, such as data input on a user device and transmitted to authentication processor 124. The authentication data may be generated based on a phone number, account number, personal code (e.g., PIN and/or password), birthdate, and/or other user-input data. By way of example, authentication processor 124 may receive the user-input data and generate an authentication code, such as a security token, a code generated by using a hash function, and the like. Authentication data may be generated by authentication processor 124 to expire within a predetermined amount of time, such as one minute, thirty second, and the like.

Authentication code data may be generated based on geo-location data, such as a location associated with a user device (e.g., user device 140 or user device 202). For example, if a user is requesting authentication from a user device to receive access to an online registry and the authentication module 132 determines that an authentication code should be transmitted to the user device based on data stored in data storage 126 (or from a third party), the authentication processor 124 may determine a location of the user device, for example when geo-location services are activated at the user device. When the authentication processor confirms that the user device is at a particular location specified by the authentication processor, the authentication processor 124 may determine than an authentication code cannot be generated.

Authentication data may be generated to be included with a notification, such as an SMS message, an MMS message, an e-mail, a push notification, a voicemail message, and the like. A notification may include data indicative of how to use the authentication code and/or data indicative of a user authentication request. For example, where authentication data is transmitted in a push notification, the push notification may include a link to open a website, a mobile application, an authentication request notification, and/or an SMS message to input the authentication code and/or response. In the same manner, an SMS message, MMS message, e-mail, and the like may include a link to direct a customer to input the authentication data and/or authentication response for access to the online registry.

Authentication processor 124 may utilize multi-factor authentication, and may also evaluate a unique user ID-secure link token pair to confirm the location of the user device. Authentication processor 124 may also establish a secure communication interface with a third party social networking system, and may evaluate security permissions associated with a user's social networking profile, to evaluate whether to share a secure link that provides access to the enhanced distributed online registry.

At block 412, authentication processor 124 may receive user data and user input associated with an authentication request from user device 140 via communication interface 142. Authentication processor 124 may evaluate the user data and user input. If authentication fails, the process may end at block 414.

Upon authentication of the user based on evaluation of the user data and user input, online registry system may transmit a unique secure link generated for a particular registry to the user device that provides access to the enhanced distributed online registry at block 416. Recipient registry users may be required to create accounts to access an online registry. The system generated secure link may utilize a token and may include a unique id associated with the recipient registry user account. Authentication processor 124 may generate an audit log that records online registry activity, which may include which users have been authenticated to view the registry, which users have requested to view the registry, and which users have actually accessed the online registry.

In an embodiment, authentication processor 124 may request via communication interface 142 the exact location of a user device, which may be determined utilizing GPS, WiFi based geo-fencing technologies (NFC technologies may also be utilized), and the like. If authentication processor 124 detects that a user device is within a proximity of a particular merchant associated with the registry items of enhanced distributed registry, authentication processor 124 may automatically transmit, via communication interface 128, an alert to the user device providing a secure link to access the enhanced distributed online registry.

Online registry system may communicate with a third party rewards system utilizing an API, and may receive a notification that a user has earned or redeemed rewards for a particular merchant associated with items on the enhanced distributed online registry. Upon receiving a notification that the user has earned or redeemed rewards for a particular merchant associated with the enhanced distributed online registry, the online registry application processor 122 may transmit via communication interface 128, an alert to the associated user device providing a secure link to access the enhanced distributed online registry At block 418, a user may access the online registry via the received secure link. The user may utilize online registry application 144 on user device 140 to access the online registry. Online registry application 144 may display a user interface, which displays the online registry. Online registry system may automatically generate and transmit a notification to a customer device associated with the registry owner that a user has accessed the online registry. A user may utilize online registry application 144 to purchase items from the online registry.

At block 420, online registry application processor 122 may automatically synchronize the enhanced distributed online registry in real time as registry items are added and purchased. Once an item has been purchased, online registry application processor 122 will automatically mark the item as purchased. Accordingly, as soon as the item is purchased, the online registry will be automatically updated and users accessing the registry will see this update in real time. To accomplish this, online registry application processor 122 may utilize Web Socket connections to push real time data to user devices by establishing a persistent bi-directional connection between the client and the online registry server. As such, the data is delivered much faster than a traditional push notification because of the persistent connection, which facilitates a more efficient user of system resources to handle frequent data update by providing a persistent exchange of data in real time.

Online registry application processor 122 may transmit alerts, via push notifications, to a user device based on these automatic synchronizations indicating whether registries items have been added, purchased, removed, and whether additional registry items have been recommended.

The process may end at block 422.

Figure 5:
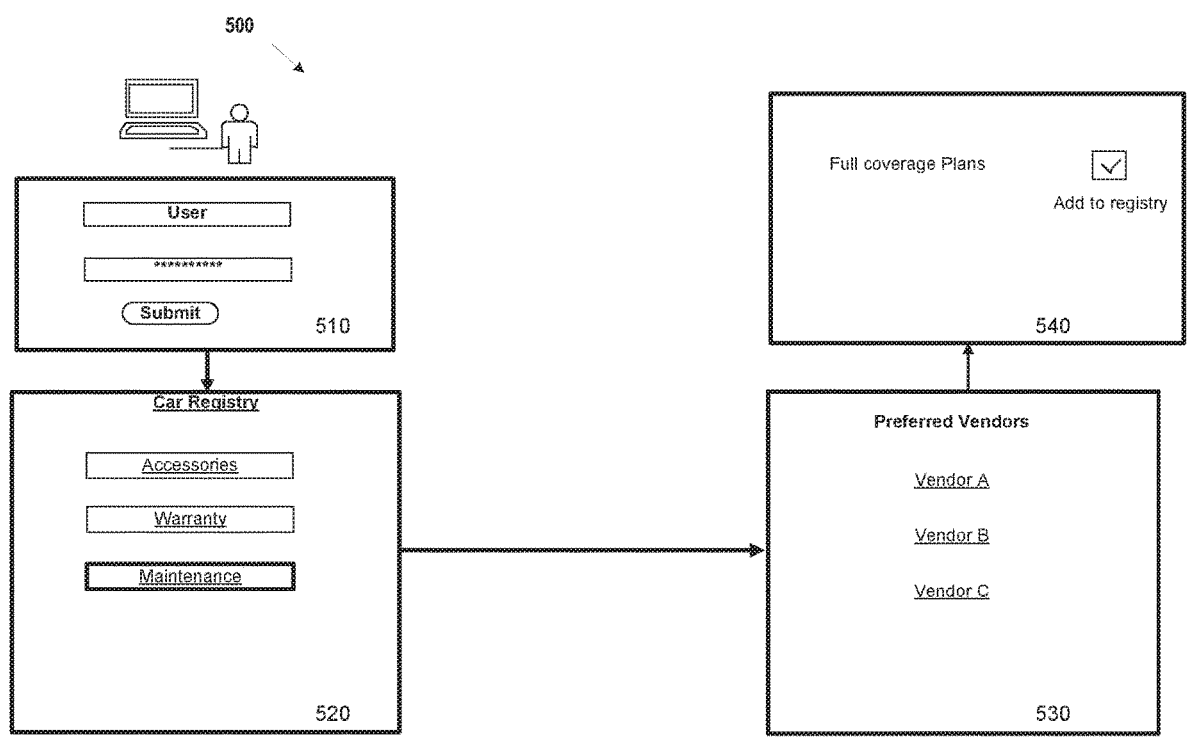
FIG. 5 depicts an example user interface that may be utilized by a customer to select items to add to the system generated enhanced distributed online registry.

FIG. 5 depicts an example user interface 500 on a user device that may be utilized by a customer (registry owner) to select items to add to the system generated enhanced distributed online registry. For example, a customer who has purchased an item such as a car utilizing an acquisition system may log in to an online registry application 510 which may display a summary of the system generated online registry 520. A customer may also utilize the application to add items to the online registry. For example, upon clicking on the maintenance registry item the user interface may display a list of preferred vendors 530 associated with the selected maintenance registry item. The customer may select a vendor, and may be presented with the vendors respective maintenance plans, of which the customer may select a particular plan(s) to add to the registry, which will be updated in real time.

Figure 6:
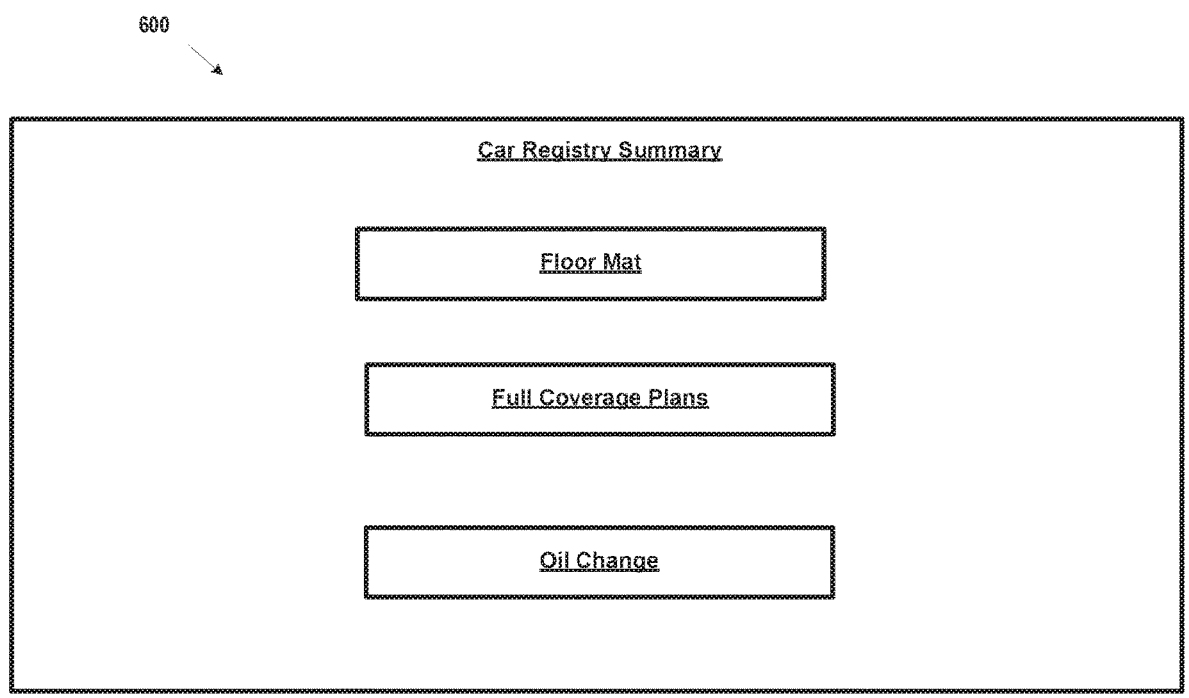
FIG. 6 depicts an example user interface that displays a summary of the system generated enhanced distributed online registry, that may be automatically updated in real time.

FIG. 6 depicts an example user interface 600 on a user device that displays a summary of the system generated enhanced distributed online registry, that may be automatically updated in real time. For example, user interface 600 displays system generated compatible car accessory registry items.

Figure 7:
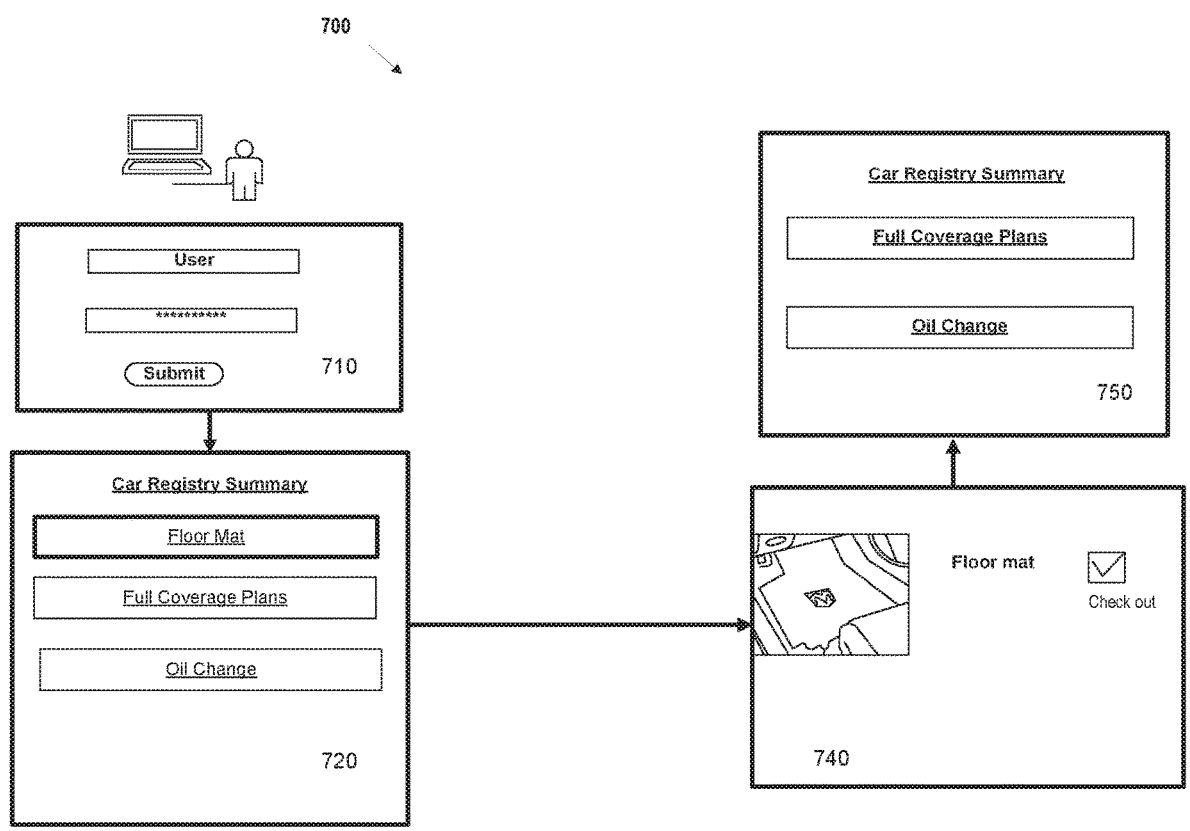
FIG. 7 depicts an example user interface that may be utilized to authenticate a user to provide access to the system generated enhanced distributed online registry to display and allow the user to purchase items electronically.

FIG. 7 depicts an example user interface 700 on a user device that may be utilized to authenticate a user to provide access to the system generated enhanced distributed online registry to display and allow the user to purchase items electronically from the system generated enhanced distributed online registry. A user may log in to an online registry application 710 which may display a summary of the system generated online registry 720 for a customer (registry owner) who has purchased a car. A customer may also utilize the application to select a registry item to purchase 740. The user may purchase the selected registry item from within the online registry application and does not need to leave the application and purchase the item on the associated merchant's site. The online registry application may utilize an API to communicate with the merchant site to facilitate this transaction. The application may utilize an Iframe to embed third party content from the associated merchant site in the user interface. Accordingly the online registry application provides a seamless experience for the user, who does not have to leave the application to purchase a registry item. Online registry application 144 will be integrated with a transaction system to facilitate the associated transaction. Once the transaction has been completed, the online registry will be updated in real time.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

In the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

The invention claimed is:

1. A system for generating an enhanced distributed online registry, comprising:
    an acquisition server;
    a data storage adapted to stores customer identification information, customer financial information, and one or more customer acquisition preferences that enables the generation, transmission and processing of compatible customer acquisition data; and
    a communication interface adapted to facilitates secure integration and transaction processing between the acquisition server, the data storage, a merchant system, an acquisition system, an account provider system and/or a user device to provide simultaneous financing prequalification, financing and transaction processing in real time;
    wherein the acquisition server is adapted to establish and utilize a secure connection between the acquisition server, the data storage, a merchant system, an acquisition system, an account provider system and/or a user device to:
        provide real-time acquisition determinations;
        concurrently execute an acquisition and build acquisition content associated with the acquisition determination and compatible customer acquisition data, wherein the content is configured to be processed by machine learning and natural language processing technologies and learning models based on system generated factors associated with the acquisition; and
        transmit, via the communication interface, to an online registry application processor, the acquisition content and an associated acquisition request approval including at least customer identification information, customer financial information, and one or more customer acquisition preferences retrieved from the data storage, to generate online registry items that are compatible with the customer acquisition and the customer acquisition preferences.

2. The system of claim 1, further comprising an authentication processor that is adapted to receives user data and user input associated with an authentication request, sent from the user device via the communication interface, to authenticate the user.

3. The system of claim 2, wherein upon authentication of the user based on evaluation of the user data and user input, the system is adapted to transmit a secure link to the user device that provides access to the acquisition request approval.

4. The system of claim 2, wherein the authentication processor is adapted to confirm the location of the user device over a wireless connection by evaluating a unique user ID—secure link token pair.

5. The system of claim 1, wherein the acquisition server is adapted to establish a secure communication interface with a third party social networking system.

6. The system of claim 5, wherein the acquisition server is adapted to transmit to a user device, via a push notification, a request for permission to share with the third party social networking system the acquisition content and the associated acquisition request approval.

7. The system of claim 5, wherein the acquisition server is adapted to generate a user profile that is stored in the data storage, wherein the user profile indicates whether a user opts in or opts out to automatically sharing notifications of acquisitions via third party social media systems.

8. The system of claim 1, wherein the acquisition server is adapted to make calls to the online registry system via private Application Programming Interfaces (APIs) utilizing a token to provide a secure communication channel.

9. The system of claim 1, wherein the acquisition server is adapted to utilize a web scraping API to extract content related to acquisitions from third party websites.

10. The system of claim 1, wherein the online registry application processor is adapted to automatically synchronize the enhanced distributed online registry in real time as acquisition as acquisition content and an associated acquisition request approval are received from the acquisition server.

11. A method for generating an enhanced distributed online registry comprising:
    storing in a data storage, customer identification information, customer financial information, and one or more customer acquisition preferences that enables the generation, transmission and processing of compatible customer acquisition data; and
    establishing and utilizing a secure connection to facilitate integration and transaction processing between the acquisition server, the data storage, a merchant system, an acquisition system, an account provider system and/or a user device to provide simultaneous financing prequalification, financing and transaction processing in real time;

providing real-time acquisition determinations;

concurrently executing an acquisition and building and synchronizing acquisition content associated with the acquisition determination and compatible customer acquisition data, wherein the content is configured to be processed by machine learning and natural language processing technologies and learning models based on system generated factors associated with the acquisition; and transmitting, to an online registry application processor, the acquisition content and an associated acquisition request approval including at least customer identification information, customer financial information, and one or more customer acquisition preferences retrieved from the data storage, to generate online registry items that are compatible with the customer acquisition and the customer acquisition preferences.

12. The method of claim 11, further comprising authenticating a user by receiving user data and user input associated with an authentication request.

13. The method of claim 12, further comprising, upon authentication of the user based on evaluation of the user data and user input, transmitting a secure link to a user device that provides access to the acquisition request approval.

14. The method of claim 13, further comprising confirming the location of the user device over a wireless connection by evaluating a unique user ID—secure link token pair.

15. The method of claim 11, further comprising establishing a secure communication interface with a third party social networking system.

16. The method of claim 15, further comprising transmitting to a user device, via a push notification, a request for permission to share with the third party social networking system the acquisition content and the associated acquisition request approval.

17. The method of claim 15, further comprising generating a user profile that is stored in the data storage, wherein the user profile indicates whether a user opts in or opts out to automatically sharing notifications of acquisitions via third party social media systems.

18. The method of claim 11, further comprising making calls to the online registry system via private Application Programming Interfaces (APIs) utilizing a token to provide a secure communication channel.

19. The method of claim 11, further comprising utilizing a web scraping API to extract content related to acquisitions from third party websites.

20. The method of claim 11, further comprising automatically synchronizing the enhanced distributed online registry in real time as acquisition as acquisition content and an associated acquisition request approval are received from the acquisition server.

* * * * *